United States Patent Office 3,560,414
Patented Feb. 2, 1971

3,560,414
PROCESS FOR PREPARING FOAMABLE BEADS
John J. Miskel, Jr., Ramsey, and Alfred J. Ackerman, Bloomingdale, N.J., assignors to Dart Industries Inc., a corporation of Delaware
No Drawing. Filed Feb. 9, 1968, Ser. No. 704,276
Int. Cl. C08f 47/10; C08j 1/26
U.S. Cl. 260—2.5                                11 Claims

ABSTRACT OF THE DISCLOSURE

The process comprises coating beads of a polymer such as polystyrene with an organic agent, for example, zinc stearate, impregnating the coated beads with liquefied butane at conditions sufficient to maintain the butane in the liquefied state, removing the excess butane from the impregnated beads and recovering the resulting foamable beads. Coating the beads prevents bead agglomeration during the impregnation step.

BACKGROUND OF INVENTION

(1) Field of invention

This invention relates to a process for preparing foamable beads. More particularly, it relates to a process for preparing foamable beads by coating styrenic beads and impregnating the coated beads in a liquefied blowing agent.

Foamable beads containing a blowing or foaming agent are widely used in the production of rigid polymer foams. The blowing agent has a boiling point below the softening point of the thermoplastic beads and exerts very little solvent action on the beads. When the foamable beads are heated to their softening point, the blowing agent vaporizes causing the beads to expand to about 5 to 30 times their original size. The foamable beads are easily molded into a wide variety of useful articles including cups, packaging materials, refrigerator and structural components, insulation board and the like.

During the impregnation of polymer beads with a blowing agent, the impregnated beads tend to agglomerate or stick together to form large clumps of beads. This is true because of the small amount of solvent action exerted by the blowing agent. As the impregnation temperature increases, the tendency to agglomerate increases. The formation of large clumps makes the impregnation of the individual beads in the clumps very difficult and requires an additional step to separate the clumps into free-flowing beads suitable for molding.

(2) Description of prior art

The prior art discloses various processes for impregnating thermoplastic beads with blowing agents including butane to produce foamable beads. In U.S. Pat. 2,893,963, one such process is described in which polystyrene beads, which are prepared by an aqueous suspension polymerization process, are treated with a liquefied $C_4$ hydrocarbon mixture blowing agent consisting predominately of butane while still in aqueous suspension. This prior art process requires the use of certain non-reactive liquid solvents or swelling agents in addition to the conventional suspension stabilizing systems.

Other prior art processes for treating styrenic polymers with low boiling aliphatic hydrocarbon blowing agents including butane in aqueous suspensions are described in U.S. Pats. 2,888,410 and 3,085,073. Each of these processes requires the use of an aqueous diluent and suspension stabilizers and other media to insure sufficient incorporation of the aliphatic hydrocarbon into the thermoplastic beads. In the process of U.S. Pat. 3,265,643, a blowing agent such as butane in its gaseous form is incorporated into polystyrene in an aqueous suspension in which the styrene monomer serves as the diluent. However, one of the disadvantages of each of the foregoing processes is the requirement of additional emulsifying agents, suspending agents and diluents other than butane to properly incorporate the butane blowing agent into the thermoplastic beads.

Other prior art processes disclose the use of dry butane gas to impregnate the styrenic polymer beads in a non-aqueous environment, see U.S. Pats. 3,126,354 and 3,127,360. However, in these processes which teach against the use of a liquid diluent, long periods are required to impregnate the beads with the gaseous butane blowing agent.

In the prior art processes using hydrocarbon blowing agents other than butane, such as pentane, hexane, heptane, petroleum ether and the like, in the absence of an aqueous diluent and suspension stabilizer, the formation of bead agglomerates or clumps poses a significant problem. U.S. Pat. 3,304,274 describes a method of coating polymer beads with an inorganic siliceous material such as calcium silicate prior to impregnating the beads with a normally liquid aliphatic hydrocarbon of the latter type. However, such inorganic coating agents are ineffective in preventing agglomeration of the beads impregnated with liquefied butane. Although organic materials such as zinc stearate, have been intimately incorporated into polymer beads before impregnation so that the beads more rapidly absorb the normally liquid aliphatic hydrocarbon blowing agent (see U.S. Pat. 2,857,341), such materials have not been used to coat the exterior surface of the beads to prevent subsequent bead agglomeration during the impregnation step.

SUMMARY OF THE INVENTION

In contrast to these prior art processes, the present invention is directed to a process wherein styrenic thermoplastic beads are impregnated with liquefied butane which serves as both a diluent and a blowing agent. This process results in improvements over prior art processes which incorporate blowing agents into thermoplastic beads to produce foamable beads. In the present process, liquefied butane is incorporated into the beads in very short periods in a non-aqueous environment without the formation of bead agglomerates and without the use of suspension agents, emulsifying agents and the like.

Therefore, it is an object of the present invention to provide a more efficient process for impregnating styrene-containing polymer beads with sufficient blowing agent to render them foamable when the beads are heated to their softening point.

It is also an object of this invention to provide a process for impregnating styrene-containing polymer beads with a blowing agent to produce free-flowing foamable beads without agglomeration.

In accordance with this invention, there is provided a process for preparing foamable beads which comprises coating the surface of the thermoplastic beads comprising a styrene polymer with an organic coating agent, impregnating the resulting coated beads in an impregnation zone with a liquefied butane blowing agent at conditions to maintain the butane in its liquefied state, removing the excess butane from the impregnated beads and recovering the resulting foamable beads.

The organic coating agent used in this process is substantially insoluble in butane and has the ability to produce a thin film over the entire surface of each of the thermoplastic beads while permitting the diffusion of butane therethrough. A suitable coating agent consists of a metallic soap of a fatty acid having from 8 to 22 carbon atoms or an amide or a substituted amide of such an acid.

PREFERRED EMBODIMENTS OF THE PRESENT INVENTION

In a more specific embodiment of the present invention, the surface of the styrenic polymer beads is coated with the organic coating agent in its finely divided form, the coated beads are impregnated in an impregnation zone with liquefied butane at conditions sufficient to maintain the butane in its liquefied state and the beads are then agitated in the impregnation zone at these conditions for a period of from ¼ to 25 hours. The impregnation step is carried out preferably at a temperature in the range of 25° to 60° C., and more preferably at a temperature of about 35° to 55° C., and at a pressure sufficient to maintain the butane in its liquefied state. The minimum pressure to be employed in this process is the vapor pressure of the liquid butane at the particular temperature employed, i.e., in the range of about 35 p.s.i.g. at 35° C. to about 60 p.s.i.g. at 55° C. Preferably, the beads are agitated in the impregnation zone at the latter conditions for a period of at least ½ hour to incorporate 4 weight percent or more butane into the beads. After the beads have been impregnated with the butane blowing agent, they are separated from the butane diluent to yield the free-flowing foamable beads.

At least 4 and up to about 20 weight percent butane should penetrate evenly throughout each of the beads to obtain the desired foamable bead product. If less than 4 weight percent butane is incorporated into the beads after impregnation, the beads generally will not expand properly when heated to their softening temperatures and will yield a higher density product after foaming. If the butane does not penetrate evenly to the center of each of the beads, the resulting beads will have what is termed "hard cores." Molded articles prepared from beads having less than 4 weight percent butane after impregnation and having these hard cores will contain surface defects and have densities higher than desired which often render the articles ineffective for their intended use.

The thermoplastic resins used in the process of this invention comprise homopolymers of styrene, copolymers of styrene containing a major portion of styrene and blends of styrene polymers with copolymers, i.e., butadiene-styrene copolymers. Such resins have a glass transition temperature of above 50° C. and usually about 85° to 100° C. The resins are employed in the process of this invention in the form of discrete particles or beads having an average particle size of between about 10 to 60 mesh, preferably between 20 and 40 mesh.

The preferred organic coating agent which can be employed in the present process consists of metallic soaps of fatty acids having from 8 to 22 carbon atoms, preferably 12 to 20 carbon atoms, and the amides or substitute amides of such fatty acids. In the case of metallic soaps, zinc, calcium, barium, aluminum and magnesium soaps are preferred. Exemplary fatty acids from which the metallic soaps are derived include caprylic acid, capric acid, lauric acid, myristic acid, palmitic acid, stearic acid, oleic acid, linoleic acid and the like. Examples of the preferred metallic soaps include zinc stearate, calcium stearate, barium stearate, magnesium stearate, aluminum stearate and aluminum oleate.

The amides which are useful as coating agents include lauramide, myristamide, palmitamide, stearamide, oleamide, linoleamide, erucamide and mixtures thereof. The substituted amides useful as coating agents include N-(n-octyl) oleamide, N-(n-dodecyl) oleamide, N-(n-myristyl) oleamide, N-(n-palmityl) oleamide, N-(n-octadecyl)oleamide, N-(n-oleyl) oleamide, N-oleyl myristamide, N-oleyl capramide, N-oleyl stearamide, N-oleyl erucamide, N-oleyl palmitamide, N-ethanol stearamide, N-methanol stearamide and mixtures thereof.

The preferred substituted amides for the present process are high melting waxes, i.e., having a melting point at 75° to 160° C., consisting of an N,N'-alkylbis-fatty acid amide in which the alkyl group has from 1 to 10 carbon atoms. Examples of such waxes include N,N'-methylenebis-stearamide, N,N'-methylenebis-oleamide, N,N'-methylenebis-palmitamide, N,N'-ethylbenebis-stearamide, N,N'-ethylenebis oleamide, N,N'-ethylenebis-palmitamide and mixtures thereof. An especially preferred N,N'-alkylbis-fatty acid amide is a synthetic wax having a high melting point and consisting of N,N'-ethylenebis-stearamide. This material is sold under the trademark "Advawax 220" by Carlisle Chemical Works, Inc. Other wax materials of the same type are sold under the trademark "Acrawax" "A," "B" and "C" by Glyco Products Company, which materials melt at about 95–97° C., 86–90° C. and 140–143° C., respectively. A more complete discussion of the latter waxes are found in A. H. Warth: The Chemistry and Technology of Waxes, page 487, Reinhold Publishing Company (1960).

The coating step comprises introducing about 0.05 to 5%, preferably 0.1 to 1%, by weight of the finely divided coating agent based on the weight of the polymer beads into a dry blender such as a drum blender or double cone blender, adding the polymer beads and dry blending for a period of time in order to produce a finely distributed layer of the coating agent over the exterior surface of the beads.

Each of the steps of the process of this invention is carried out in conventional equipment. The impregnation zone comprises, for example, a glass-lined vessel with an agitator. Any suitable means, i.e., steam coils or a steam jacket, can be used for heating the liquid pool to the desired temperature after the beads have been added. The thermoplastic beads can either be added to the vessel prior to adding the liquefied butane, or after, as long as agitation is commenced immediately after the butane and beads are combined.

In one embodimemnt of the present invention, the liquefied butane is introduced into the impregnation zone and brought to the desired temperature and the coated beads are then added to the liquefied butane with agitation. Alternatively, the coated beads are first introduced into the impregnation zone followed by the liquefied butane, and the resulting bead slurry is gradually heated with agitation to the desired temperature at a pressure sufficient to maintain the butane in its liquefied state. After the desired temperature is reached, it must be closely regulated to prevent possible overheating which can result in agglomeration of even the coated beads.

After the beads have been impregnated with the liquefied butane, the butane diluent is removed from the impregnated beads by any conventional liquid-solid separation step such as filtering or centrifuging. Flashing the butane diluent from the beads at ambient temperature and atmospheric pressure is another effective method of separation. This method rapidly lowers the temperature of beads to at least room temperature. The beads from the separation step are cool and dry to the touch, but the surface and interstices of the beads are saturated with the butane blowing agent. An aging step is usually required to dissipate the excess butane blowing agent, primarily from the surface of the beads. In addition during aging, the butane blowing agent remaining in the interstices of the beads is allowed to penetrate into the interior of the beads. If the beads are not properly aged they will have an irregular cell structure after expansion with large cells near the surface and hard cores at the center. One suitable method of aging is to place the beads in a longitudinal vessel and to rotate the vessel causing the beads to tumble for a period of at least 24 hours at no greater than ambient temperatures, i.e., about 30° C. or below, and at atmospheric pressure or slightly above. The resulting aged beads have small uniform cell structures throughout the beads after expansion upon microscopic examination.

The following examples illustrate the present invention:

Example 1

In all of the runs and controls of this example, 100 grams of polystyrene beads having an average particle size of 20 to 40 mesh were dry blended with a coating agent, with one exception. In the runs 1 through 17 of Table I below, a finely divided, organic coating agent such as zinc stearate or "Acraway C" was used. In Control A no coating agent was used and Controls B, C, D and E a finely divided, inorganic coating agent such as calcium silicate or tricalcium diphosphate was used as set forth in Table II below. The resulting coated polystyrene beads were added to either a glass or stainless steel bowl reactor equipped with an agitator. About 400 ml. of chemically pure liquefied n-butane was pressured into the reactor with agitation. The bead slurry was gradually heated from room temperature to the desired impregnation temperature. The amount and type of coating agent employed, the impregnation temperature, time and pressure, and the amount of butane incorporated into the beads are summarized in Tables I and II below. After each impregnation step the reactor was vented to remove the butane diluent and the impregnated beads were filtered and allowed to stand at ambient temperature for about ½ hour to remove excess butane blowing agent. Samples of the resulting free-flowing foamable beads were analyzed to determine the amount of butane incorporation, except for Control A.

TABLE I

| Run | Weight percent of coating agent | Temperature, °C. | Time, hours | Pressure, p.s.i.g. | Weight percent butane incorporation |
|---|---|---|---|---|---|
| 1 | 1% zinc stearate | 40 | 2 | 45 | 8.9 |
| 2 | do | 40 | 3 | 41.5 | 9.3 |
| 3 | 1% "Acrawax C" | 40 | 3 | 40 | 9.1 |
| 4 | 0.5% "Acrawax C" | 40 | 3 | 41 | 8.65 |
| 5 | 1% "Acrawax C" | 45 | 2 | 51 | 9.0 |
| 6 | do | 45 | 1½ | 53 | 9.9 |
| 7 | do | 50 | 1½ | 57 | 9.9 |
| 8 | 1% zinc stearate | 50 | 1½ | 62 | 9.7 |
| 9 | 1% "Acrawax C" | 50 | 1 | 61 | 9.1 |
| 10 | 1% zinc stearate | 50 | 1 | 61 | 8.9 |
| 11 | 0.3% zinc stearate | 50 | ¾ | 59 | 9.9 |
| 12 | 0.1% zinc stearate | 50 | 1 | 56 | 10.4 |
| 13 | 0.1% "Acrawax C" | 50 | 1 | 56 | 10.1 |
| 14 | 0.5% "Acrawax C" | 54 | ½ | 74 | 10.2 |
| 15 | 0.5% zinc stearate | 54 | ½ | 65 | 8.7 |
| 16 | 0.1% "Acrawax C" | 54 | ½ | 65 | 9.9 |
| 17 | 0.1% zinc stearate | 54 | ½ | 65 | 9.5 |

TABLE II

| | Weight percent of coating agent | Temperature, °C. | Time, hours | Pressure, p.s.i.g. | Weight percent butane incorporation |
|---|---|---|---|---|---|
| Control: | | | | | |
| A | 0 | 40 | ½ | 45 | (*) |
| B | 0.5% calcium silicate | 50 | 1 | 60 | 9.2 |
| C | 0.5% tricalcium diphosphate | 50 | 1 | 56 | 9.4 |
| D | 0.5% calcium silicate | 54 | ½ | 74 | 8.75 |
| E | 0.5% tricalcium diphosphate | 54 | ½ | 65 | 9.7 |

*No measurement was made of butane content.

In runs 1 to 17 with the polystyrene beads coated with from 0.1 to 1% of an organic coating agent, no bead agglomeration was observed and the resulting beads were free-flowing. However, is Controls A, B, C, D and E with the beads either not coated or coated with an inorganic coating agent, severe bead agglomeration was observed. The clumps of beads formed in Controls A, B, C, D and E were of such a magnitude to prevent their subsequent reduction to free-flowing beads by any practical means.

Table I indicates that a critical time-temperature relationship exists in the impregnation of the polystyrene beads with liquefied butane. For example, as the temperature of the impregnation increased from 40° C. to 54° C. the time required to impregnate the polystyrene beads to about the same level of butane decreased from 3 hours to ½ hour.

Samples of the impregnated beads were stored in sealed soda bottles and aged at about 0° C. for at least 24 hours. The aged beads were expanded in boiling water and the thus expanded beads were examined under a microscope. Beads from each of the aged samples exhibited uniform closed cell structures free of hard cores.

Example 2

In each run of this example, 29 pounds of polystyrene beads of the same type used in Example 1 were dry blended with one of the coating agents given in Table III below and the coated beads were added to a reactor equipped with an agitator. 32 pounds of liquefied butane was then added. The resulting bead slurry was gradually heated to the desired temperature and agitated in the range from 50 to 150 r.p.m. After the impregnation, the butane was flashed off and samples of beads from each run and control were measured for butane content. Table III summarizes the results:

TABLE III

| | Weight percent of additives | Temperature, °C. | Time, hours | Pressure, p.s.i.g. | Weight percent butane incorporation |
|---|---|---|---|---|---|
| Run 18 | 0.5% zinc stearate | 32 | 4 | 30 | 3.8 |
| Run 19 | do | 34 | 4 | 32 | 6.0 |
| Run 20 | 1% zinc stearate | 35 | 6 | 46 | 6.6 |
| Run 21 | do | 40 | 3 | 40 | 8.1 |
| Run 22 | do | 45 | 2 | 53 | 8.3 |
| Control F | 1% calcium silicate | 40 | 3 | 50 | 7.7 |
| Control G | do | 40 | 2 | 50 | 7.9 |

No bead agglomeration occurred during the impregnation step of Runs 18 through 22 after the polystyrene beads were coated with 0.5 to 1% zinc stearate. These results were again in sharp contrast to the severe bead agglomeration that occurred during the impregnation step of Controls F and G when the beads were coated with calcium silicate.

Table III indicates that as the impregnation temperatures decreased the level of butane incorporation decreased. Run 18 indicates that at 32° C. less than the optimum amount butane, i.e., at least 4 weight percent butane, was incorporatted into the polystyrene beads. Therefore, in order to achieve the desired level of liquefied butane incorporation, the impregnation step should be carried out at a temperature in the range of 35° to 55° C.

It is apparent that numerous variations can be made in the specific embodiment of this invention without departing from its spirit and all such variations that fall within the scope of the appended claims are intended to be embraced thereby.

What is claimed is:

1. A process for preparing foamable beads which comprises the following steps:
  (a) coating the surface of thermoplastic beads comprising a styrene polymer with a finely divided, organic coating agent selected from the group consisting of a metallic soap of a fatty acid having from 8 to 22 carbon atoms, an amide of said fatty acid and a substituted amide of said fatty acid,
(b) impregnating the resulting coated beads in an impregnation zone with a liquid consisting of liquid butane which serves as both a diluent and a blowing agent at conditions sufficient to maintain said butane in a liquid state,
(c) agitating said coated beads at these conditions in said impregnation zone for a period of about ¼ to 25 hours,
(d) separating the impregnated beads from the butane diluent, and
(e) recovering the resulting free-flowing foamable beads.

2. The process of claim 1 wherein impregnating step (b) is carried out at a temperature in the range of 25° to 60° C.

3. The process of claim 1 wherein said coating agent is present on said thermoplastic beads in an amount of about 0.05 to 5 percent by weight based on said beads.

4. The process of claim 3 wherein said coating agent is zinc stearate.

5. The process of claim 3 wherein said coating agent is a high melting wax consisting of an N,N'-alkylbis-fatty acid amide and wherein said alkyl group has from 1 to 10 carbon atoms.

6. The process of claim 1 wherein said coated beads are introduced into said impregnation zone with a liquid consisting essentially of liquid butane preheated to a temperature about 35° to 55° C. with agitation and wherein impregnation step (b) is carried out at such a temperature.

7. A process for preparing foamable beads which comprises the following steps:
(a) coating the surface of polystyrene beads with about 0.05 to 2 percent by weight based on said beads of a finely divided, organic coating agent selected from the group consisting of a metallic soap of a fatty acid having from 8 to 22 carbon atoms, an amide of said fatty acid and a substituted amide of said fatty acid,
(b) introducing coated polystyrene beads into an impregnation zone,
(c) introducing a liquid consisting of sufficient liquid butane into said impregnation zone to serve as both a diluent and a blowing agent,
(d) gradually heating the contents of said impregnation zone with agitation to a temperature of about 35° to 55° C. at a pressure sufficient to maintain said butane in a liquid state,
(e) agitating said beads at these conditions in said impregnation zone for a period of about ¼ to 25 hours,
(f) separating the resulting impregnated beads from the butane diluent,
(g) aging said impregnated beads at no greater than ambient temperatures and at least about atmospheric pressure for a period of at least 24 hours to remove excess butane blowing agent and to permit the absorbed butane to penetrate into the interior of the beads, and
(h) recovering from the step (g) free-flowing foamable beads.

8. The process of claim 7 wherein said coating agent is present on said thermoplastic beads in an amount of at least 0.1 percent by weight based on said beads.

9. The process of claim 8 wherein said coating agent is zinc stearate.

10. The process of claim 8 wherein said coating agent is a high melting wax consisting of an N,N'-alkylbis-fatty acid amide and wherein said alkyl group has from 1 to 10 carbon atoms.

11. A process for preparing foamable beads which comprises coating the surface of thermoplastic beads comprising a styrene polymer with an organic coating agent selected from a metallic soap of a fatty acid having 8 to 22 carbon atoms, an amide of said fatty acid or substituted amide of said fatty acid, impregnating the resulting coated beads in an impregnation zone with a liquid consisting essentially of liquid butane blowing agent in the absence of a swelling agent at conditions sufficient to maintain the butane in a liquid state, removing the excess butane from the beads after impregnation and recovering the resulting foamable beads substantially free from agglomeration.

References Cited
UNITED STATES PATENTS

| | | | |
|---|---|---|---|
| 2,857,341 | 10/1958 | Colwell et al. | 260—2.5B |
| 2,888,410 | 5/1959 | Buchholtz | 260—2.5B |
| 2,893,963 | 7/1959 | Cleland et al. | 260—2.5B |
| 3,085,073 | 4/1963 | Lintner et al. | 260—2.5B |
| 3,126,354 | 3/1964 | Day | 260—2.5B |
| 3,127,360 | 3/1964 | Harrison | 260—2.5B |
| 3,015,132 | 1/1962 | Bunting | 260—2.5B |
| 3,385,804 | 5/1968 | Hill, Jr. | 260—2.5B |

SAMUEL H. BLECH, Primary Examiner

M. FOELAK, Assistant Examiner

U.S. Cl. X.R.

117—100; 260—23, 93.5